July 12, 1938.  B. W. HENDERSON  2,123,603
HORN PROTECTOR
Filed Jan. 30, 1936
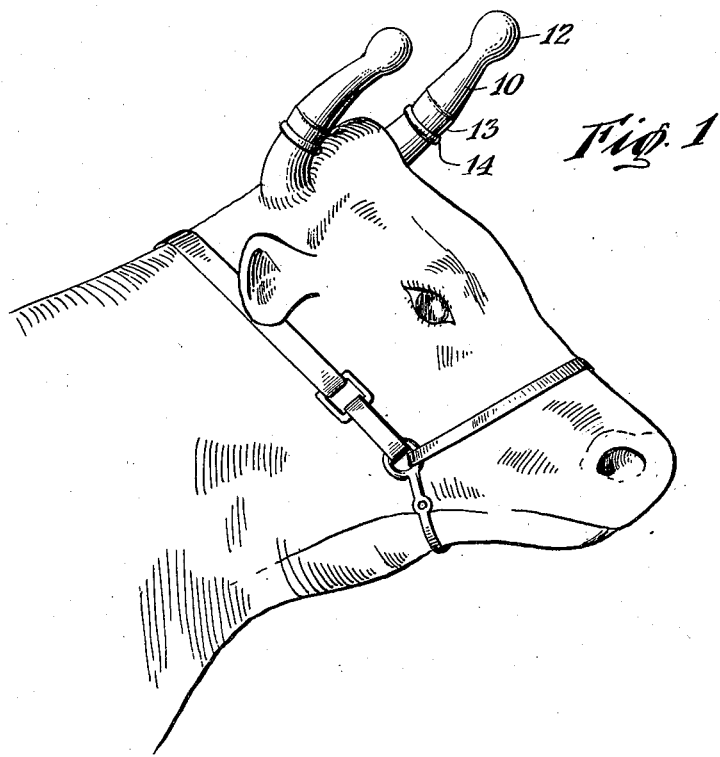
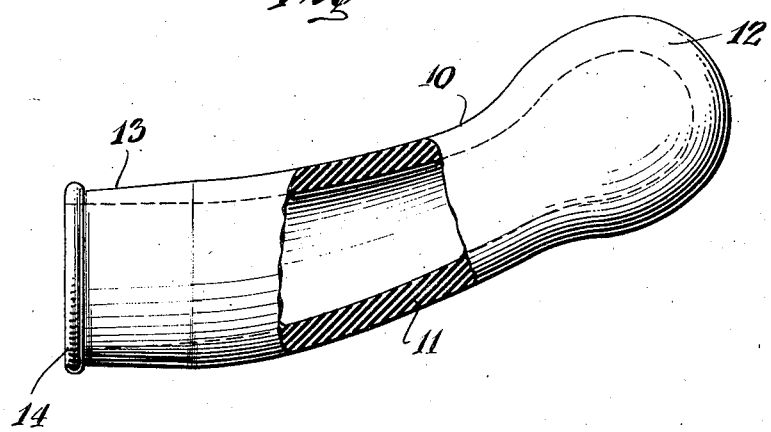

Patented July 12, 1938

2,123,603

UNITED STATES PATENT OFFICE 2,123,603

HORN PROTECTOR

Bancroft W. Henderson, Montclair, N. J.

Application January 30, 1936, Serial No. 61,524

4 Claims. (Cl. 119—144)

This invention relates to horn protectors for cattle.

A general object of the invention is to provide an improved form of horn protector for dairy cows.

More particularly objects of the invention are to provide a horn protector of resilient material such as rubber having improved features of construction enabling it to be easily yet fixedly attached to horns of varied sizes, and which is easy and economical to manufacture.

In nearly every dairy herd there can be found at least one cow addicted to hooking or butting. This causes fear and unrest among the entire herd, and the butting sometimes leads to abortion. The leading authorities are agreed that dairy cattle produce better in a herd which has been dehorned, because of the relative absence of fear. In accordance with the present invention, a rubber tip of improved construction is affixed to the horns of at least such animals as evince a habit of hooking or butting. It has been observed by the present applicant that such an animal soon learns that it cannot frighten or injure other animals and becomes quite docile. Also, the added weight at the end of the horn, though slight, apparently causes the horn to feel unnatural and acts as a deterrent to its use for hooking and butting.

One object of the present invention, therefore, is to improve milk production generally throughout a dairy herd by curbing the horning activities of individual cows by means of a protector embodying features of the invention.

Other objects of the invention will in part be obvious and will in part appear hereinafter.

The invention accordingly comprises an article of manufacture possessing the features, properties, and the relation of elements which will be exemplified in the article hereinafter described and the scope of the invention will be indicated in the claims.

For a fuller understanding of the nature and objects of the invention reference should be had to the following detailed description taken in connection with the accompanying drawing, in which:

Fig. 1 is a view showing horn protectors embodying features of the present invention applied to the horns of a cow; and Fig. 2 is a side elevation of a horn protector constructed in accordance with the present invention, part thereof being broken away better to show the interior structure.

Referring more particularly to the drawing, and first to Fig. 2, there is shown a horn protector generally designated 10, which is preferably constructed of rubber so vulcanized as to possess considerable resilience and elasticity. The protector is of thimble-like construction, having an open end and a closed end, and is dimensioned and configured to the general shape of the horn of a cow.

Throughout most of its body portion the sidewalls of the protector are of considerable thickness, being at least about $\frac{3}{16}$ of an inch thick throughout the intermediate section designated 11, and preferably even slightly thicker at the closed end 12. This closed end is constructed so as to provide an air space between the protector and the horn, being preferably of an enlarged bulbous formation for this purpose. The relatively thick sidewalls, particularly at the bulb portion, form a self-sustaining structure. Adjacent its open end the protector walls are attenuated to form a relatively thin-walled neck 13, which is elastic and readily distendable so that it can be stretched over the horn and hug tightly thereagainst. A bead or shoulder 14 forms a rim around the open end of the protector which affords a grip for pulling it into position over the horn and also forms a constrictive band which helps to embrace the horn tightly.

The protector, thus constructed, is adapted to be pulled down over the horn until the horn tip approximately reaches the bulbous portion 12. This portion may then be compressed so as to expel air from the interior of the protector, or it may be held in a compressed condition while the protector is being applied. By virtue of its thick-walled resilient construction, the bulb, upon release of such squeezing pressure, springs back into place causing a vacuum within the protector which serves to hold it securely in place.

Such a protector is cheap and easy to make, is very easy to apply, and is capable of holding in place very firmly on the horn. When applied it has the desired effect of discouraging hooking and butting, and also of acting as a buffer to prevent injury, if the animal to which it is applied does attempt to hook or butt.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A horn protector of hollow thimble-like construction having a relatively thin elastic neck adjacent its open end, and terminating at its closed end in a compressible resilient bulb having relatively thick self-sustaining walls.

2. A rubber horn protector of hollow thimble-like construction generally shaped to fit over the horn of a cow and terminating at its closed end in a self-sustaining thick walled compressible bulb providing a vacuum space.

3. A rubber horn protector of hollow thimble-like construction closed at one end and generally shaped to fit over the horn of a cow and having the sidewalls adjacent its open end relatively thin and distendable as compared with the remaining sidewall structure, and the latter being at least thick enough to be self-sustaining when air is expelled from the interior thereof.

4. A rubber horn protector of hollow thimble-like construction generally shaped to fit over the horn of a cow having a relatively thin-walled elastic neck adjacent its open end adapted to hug tightly against a horn and having a compressible resilient closed end whereby air can be expelled from the space between the horn and the protector, the side walls at said closed end being thicker than those at the neck.

BANCROFT W. HENDERSON.